US010524300B2

(12) United States Patent
Ueda et al.

(10) Patent No.: US 10,524,300 B2

(45) Date of Patent: Dec. 31, 2019

(54) WIRELESS LOW-LATENCY AUDIO CONTENT SHARING

(71) Applicant: Bose Corporation, Framingham, MA (US)

(72) Inventors: Joji Ueda, Cambridge, MA (US); Nathan A. Blagrove, Wayland, MA (US); Naganagouda B. Patil, Ashland, MA (US)

(73) Assignee: Bose Corporation, Framingham, MA (US)

( * ) Notice: Subject to any disclaimer, the term of this patent is extended or adjusted under 35 U.S.C. 154(b) by 6 days.

(21) Appl. No.: 15/829,382

(22) Filed: Dec. 1, 2017

(65) Prior Publication Data

US 2019/0174557 A1 Jun. 6, 2019

(51) Int. Cl.

| | |
|---|---|
| ***H04W 76/14*** | (2018.01) |
| ***H04B 1/3827*** | (2015.01) |
| ***H04L 29/06*** | (2006.01) |
| ***H04R 25/00*** | (2006.01) |
| ***G06F 3/16*** | (2006.01) |
| ***H04R 3/12*** | (2006.01) |
| ***H04W 52/02*** | (2009.01) |
| ***H04W 4/80*** | (2018.01) |

(Continued)

(52) U.S. Cl.

CPC ............ *H04W 76/14* (2018.02); *G06F 3/162* (2013.01); *H04R 3/12* (2013.01); *H04W 4/80* (2018.02); *H04W 52/0219* (2013.01); *H04M 1/7253* (2013.01); *H04R 1/1091* (2013.01); *H04R 5/033* (2013.01); *H04R 2225/55* (2013.01); *H04R 2420/07* (2013.01); *H04W 88/04* (2013.01); *H04W 88/06* (2013.01)

(58) Field of Classification Search

CPC ... H04W 76/14; H04W 52/0219; G06F 3/162; H04R 3/12; H04R 2420/07; H04M 1/7253

See application file for complete search history.

(56) References Cited

U.S. PATENT DOCUMENTS

| | | | |
|---|---|---|---|
| 8,660,055 | B2 | 2/2014 | Ueda et al. |
| 9,820,323 | B1 | 11/2017 | Young et al. |

(Continued)

FOREIGN PATENT DOCUMENTS

| | | | |
|---|---|---|---|
| WO | 2014184394 | A2 | 11/2014 |
| WO | 2014184395 | A2 | 11/2014 |
| WO | 2015185123 | A1 | 12/2015 |

*Primary Examiner* — Kiet Tang

(57) ABSTRACT

A first audio device exchanges first control signals with a source device and thereby receives first audio signals from the source device. A second audio device exchanges second control signals with the first audio device including information the second audio device needs to receive the first audio signals from the source device. The first control signals include communications using Bluetooth BR/EDR protocols and establish a first Bluetooth link for audio streaming from the source device to the first audio device. The second control signals include communications using Bluetooth Low Energy (BLE) protocols and transfer to the second audio device parameters of the first Bluetooth link, such that the second audio device can receive and decode an audio stream transmitted from the source device to the first audio device over the first Bluetooth link.

11 Claims, 8 Drawing Sheets

306
310
302
320a
330b
330a
320i
320b
330i
304a
304b
304i

(51) Int. Cl.

| | |
|---|---|
| *H04M 1/725* | (2006.01) |
| *H04R 1/10* | (2006.01) |
| *H04R 5/033* | (2006.01) |
| *H04W 88/04* | (2009.01) |
| *H04W 88/06* | (2009.01) |

(56) References Cited

U.S. PATENT DOCUMENTS

2009/0109894 A1* 4/2009 Ueda .................... H04B 1/385 370/315
2011/0228862 A1 9/2011 Yamashita
2015/0319557 A1* 11/2015 El-Hoiydi ........... H04R 25/556 455/41.2
2016/0080896 A1* 3/2016 Song .................... H04L 65/602 455/41.2

* cited by examiner

WIRELESS LOW-LATENCY AUDIO CONTENT SHARING

FIELD

This application relates to sharing audio through wireless devices, and in particular, allowing multiple devices to receive audio transmitted using a point-to-point technology.

BACKGROUND

This application is related to U.S. Pat. No. 8,660,055, the entire contents of which are incorporated here for reference.

It has become commonplace to use devices employing point-to-point wireless communications technologies to create a personal area network in the vicinity of a user of personal electronic devices carried about by the user (referred to by some as a "piconet") to convey audio from one of those personal electronic devices to one or both ears of the user, as in the case of the playback of audio stored on an audio playing device to the user. It has also become commonplace to additionally convey audio from the user to one of those personal electronic devices, as in the case of cell phone in which the user engages in telephonic communication through such point-to-point wireless communications with that device. Among the forms of such point-to-point wireless communications being used for such purposes are those that conform to the widely used Bluetooth® specification promulgated by the Bluetooth Special Interest Group of Bellevue, Wash. References to Bluetooth® in this application should be understood to refer to version 5 of the Bluetooth core specification; version 1.3.1 of the A2DP profile specification; version 1.6.1 of the AVRCP profile specification; version 1.7.1 of the HFP profile specification; version 1.4 of the AVCTP protocol specification; version 1.3 of the AVDTP protocol specification; version 1.2 of the RFCOMM specification, or to later versions that implement the relevant components of the technology in the same or similar manner.

Wireless communications conforming to the Bluetooth specification have been in use for some time to wirelessly convey two-way audio between cell phones and so-called "earpieces" that incorporate both an acoustic driver to output audio to an ear of a user and a microphone to receive audio from the mouth of the user. More recently, there has been a growing emergence of audio playing devices employing wireless communications conforming to the Bluetooth specification to wirelessly convey one-way audio from those devices to one or more acoustic drivers to output audio to one or both ears of a user.

Unfortunately, despite the growing acceptance of such point-to-point wireless communications for the conveying of audio between personal electronic devices, the point-to-point nature, the procedures required to securely establish wireless connections, and the conversions of audio between various analog and digital forms have presented various difficulties. Those difficulties include various impediments to providing audio to both ears of a user, allowing a user to easily transition from one choice of acoustic driver and/or microphone to another, and sharing audio with a personal electronic device carried by another user.

The '055 patent described a way to allow two separate wireless devices, such as one for each ear of a single user, or separate headphone devices of two different users, to receive audio signals transmitted from a single source device, where the source device is only aware of a single communication link, as Bluetooth did not then (and still does not) provide for the direct transmission of audio data to two receiving devices simultaneously. In recent years, several fully wireless earphone devices have come on the market, but it is the applicant's understanding that most of these do not transmit from the source to both receiving devices, as in the '055 patent, but instead re-transmit audio from a first receiving device to any additional receiving devices.

SUMMARY

In general, in one aspect, a system includes a first audio device, and a second audio device. Processors in the first and second audio devices cause the first audio device to exchange first control signals with a source device and thereby to receive first audio signals from the source device, and cause the second audio device to exchange second control signals with the first audio device and thereby to receive the first audio signals from the source device. The first control signals include communications using Bluetooth BR/EDR protocols and establish a first Bluetooth link for audio streaming from the source device to the first audio device. The second control signals include communications using Bluetooth Low Energy (BLE) protocols and transfer to the second audio device parameters of the first Bluetooth link, such that the second audio device can receive and decode an audio stream transmitted from the source device to the first audio device over the first Bluetooth link.

Implementations may include one or more of the following, in any combination. A third audio device may be included; the processor in the first audio device and a processor in the third audio device may cause the third audio device to exchange third control signals including communications using Bluetooth Low Energy (BLE) protocols with the first audio device such that the third audio device can receive and decode the audio stream transmitted from the source device to the first audio device over the first Bluetooth link. The source device may include a processor and a user interface, the source device processor executing a first application causing the source device to display a user interface allowing a user of the source device to control which second audio device the first audio device exchanges the second control signals with. The source device processor may execute a second application controlling the first control signals and the first Bluetooth link, the second application being isolated from data relating to the second control signals. The processors in the first and second audio devices may cause the first audio device to transmit audio detected by a microphone in the first audio device to the source device using a return channel of the first Bluetooth link, and include in the second control signals parameters of the return channel, to enable the second audio device to receive and decode the first audio device's microphone audio from the return channel of the first Bluetooth link. The processors in the first and second audio devices may include in the second control signals parameters of a return channel of the first Bluetooth link, and cause the second audio device to transmit audio detected by a microphone in the second audio device to the source device using a return channel of the first Bluetooth link.

In general, in one aspect, a system includes a first audio device in communication with a second audio device, and a third audio device. Processors in the first and third audio devices cause the first audio device to exchange first control signals with a source device and thereby to receive first audio signals from the source device, cause the first audio device to exchange second control signals with the second audio device and thereby cause the second audio device to receive second audio signals from the first audio device, and cause the third audio device to exchange third control signals with the first audio device and thereby to receive the second audio signals from the first audio device. The first and second control signals include communications using Bluetooth BR/EDR protocols and establish respective first and second Bluetooth links for audio streaming from the source device to the first audio device and from the first audio device to the second audio device. The third control signals include communications using Bluetooth Low Energy (BLE) protocols and transfer to the third audio device parameters of the second Bluetooth link, such that the third audio device can receive and decode an audio stream transmitted from the first audio device to the second audio device over the second Bluetooth link.

Implementations may include one or more of the following, in any combination. The first and second audio devices may be a wirelessly-linked stereo pair of speakers, and the second audio signals may include more than one channel of audio. A fourth audio device may be included; the processor in the first audio device and a processor in the fourth audio device may cause the fourth audio device to exchange fourth control signals including communications using Bluetooth Low Energy (BLE) protocols with the first audio device such that the fourth audio device can receive and decode the second audio signals transmitted from the first audio device to the second audio device.

Advantages include allowing multiple users, or s single user of multiple separate earpieces or speakers, to listen to the same audio content from a source device, without requiring modifications to the wireless interfaces of the source device. Additional advantages include allowing different devices to provide return audio to the source device, as well as to each other.

DESCRIPTION

Figure 1:
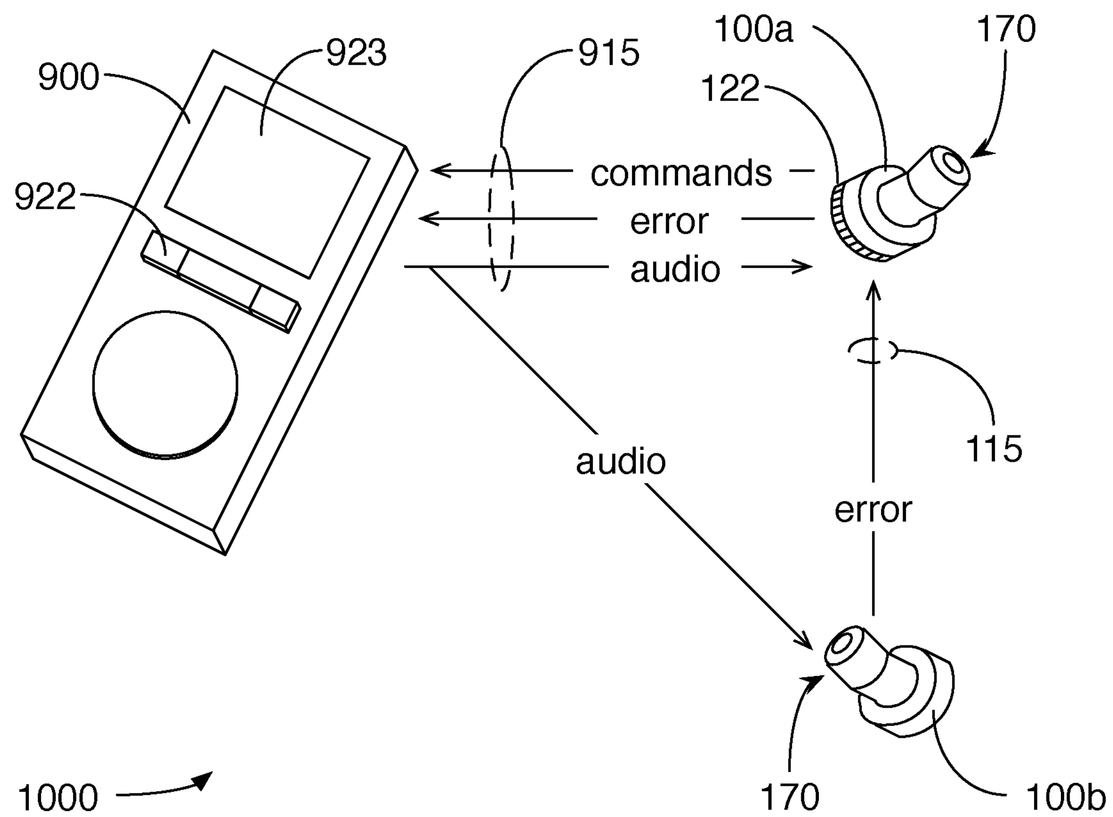
FIG. 1 is a block diagram of a wireless network incorporating multiple wireless audio devices and a personal electronic device.

FIG. 1 depicts a network 1000 in which audio is transferred among three personal electronics devices, specifically, a personal electronic device 900 and a pair of wireless audio devices 100*a* and 100*b*. The network 1000 is of a pseudo hub-and-spoke topology in which the personal electronic device 900 is presented with false indications of being in wireless communications to transfer audio solely to the wireless audio device 100*a* across a single wireless point-to-point link 915, but with the purpose of inducing the personal electronic device 900 to also transfer the audio to the wireless audio device 100*b*. In essence, the personal electronic device 900 is induced into occupying the hub position with each of the wireless audio devices 100*a* and 100*b* occupying spoke positions. Another wireless point-to-point link 115 is formed between the wireless audio devices 100*a* and 100*b* for network management purposes and to coordinate actions between them concerning receiving audio from the personal electronic device 900 as part of maintaining the pseudo hub-and-spoke topology. The technology on which either of the links 115 and 915 are based may be of any of a wide variety of types employing RF signals, infrared signals, or any of a variety of other forms of wireless transmission media, and the technologies used between the links 115 and 915 may differ. Where one or both of the links 115 and 915 employ RF signals, one or both may at least partially conform to the Bluetooth specification, or to any of a variety of other specifications for wireless networking as would be appropriate in shortness of range and limitation of power consumption for use between personal electronic devices carried by a user.

The personal electronic device 900 may be of any of a variety of types of personal electronic device, including and not limited to, various multimedia, information handling and/or communications devices such as a cell phone, a digital music player (e.g., a typical MP3 music file player), portable camera with audio playback functionality, a personal data assistant (PDA), a personal navigation device, or a smart phone integrating all of these features. At a minimum, the personal electronic device 900 is capable of providing audio in digital form across a wireless point-to-point link. This audio may be any of a variety of forms of audio, including and not limited to, digitized music stored on the personal electronic device 900, and audio received by the personal electronic device 900 from an RF transmission (e.g., FM or satellite radio). The personal electronic device 900 may also be capable of receiving remote control commands from across a wireless point-to-point link to enable the remote control of various functions of the personal electronic device 900, including commands related audio (e.g., commands to stop, pause, play, fast-forward, adjust a volume, change a channel, etc.). The commands may correspond to functions accessible through a manually-operable control 922 incorporated into the personal electronic device 900. The personal electronic device 900 may also be capable of transmitting textual or other data beyond audio, including song titles, track titles, time, date, GPS coordinates, RF signal strength, etc. These various pieces of data may correspond to data displayable on an indicator 923 incorporated into the personal electronic device 900.

The wireless audio devices 100*a* and 100*b* are meant to wirelessly receive audio and enable output of that audio in audible form. Although the pair of wireless audio devices 100*a* and 100*b* are depicted as being a pair of earbuds (also commonly referred to as "in-ear" headphones), this is intended to be illustrative of one form of device, and each of the pair of wireless audio devices 100*a* and 100*b* could be any of a number of types of devices capable of audibly outputting wirelessly-received audio (e.g., wireless speakers). Each of the wireless audio devices 100*a* and 100*b* incorporates at least one acoustic driver 170 (e.g., an electromagnetic speaker, a piezo-electric electric element, an electrostatic speaker, etc.), and each may further incorporate a manually-operable control 122 and/or an indicator (not shown). Where a given one of the wireless audio devices 100*a* and 100*b* incorporates the control 122, the control 122 may be operable to enable a user to remotely control the personal electronic device 900 and/or the other of the wireless audio devices 100*a* and 100*b*. Where a given one of the wireless audio devices 100*a* and 100*b* incorporates an indicator, the indicator may enable non-audio data to be displayed to a user.

Although the personal electronic device 900 may employ any of a variety of technologies in forming the link 915, a number of available ones of these technologies rely on an assumption that a device transmitting a piece of audio with multiple audio channels will transmit that audio to only one other device that will receive and use all of those channels. As a result, some of these technologies are not meant to separately transmit different audio channels of a piece of audio to different other devices that will receive the different audio channels and separately make use of the different audio channels. In order to accommodate such a limitation, the wireless audio devices 100*a* and 100*b* cooperate to present the personal electronic device 900 with the appearance of forming the link 915 with only a single other device (namely the wireless audio device 100*a*) to which the personal electronic device 900 transmits a piece of audio. Though both of the wireless audio devices 100*a* and 100*b* receive signals from the personal electronic device 900, only one of the wireless audio devices 100*a* and 100*b* transmits to the personal electronic device 900 (i.e., the wireless audio device 100*a*, as depicted).

While the personal electronic device 900 transmits the piece of audio across the link 915 to the wireless audio device 100*a*, the wireless audio device 100*b* also picks up the same signal and receives the same piece of audio despite not being the intended recipient. Where a packet of digitized audio is either not received or is received as corrupted by the wireless audio device 100*a*, the wireless audio device 100*a* transmits an error signal across the link 915 to the personal electronic device 900 to cause the packet to be retransmitted. Where a packet of digitized audio is either not received or is received as corrupted by the wireless audio device 100*b*, the wireless audio device 100*b* transmits an error signal across the link 115 to the wireless audio device 100*a* to be forwarded on to the personal electronic device 900 across the link 915 to cause the packet to be retransmitted.

The link 915 may also be used by the wireless audio device 100*a* to transmit remote control commands (perhaps generated as a result of a user operating the control 122) back to the personal electronic device 900. Given that the wireless audio device 100*b* only receives signals from the personal electronic device 900, and does not transmit to the personal electronic device 900, where the wireless audio device 100*b* is caused by a user to generate remote control commands, those commands are transmitted across the link 115 to be forwarded to the personal electronic device 900 across the link 915. In some examples, remote control commands for operation of the audio devices can also be sent from the personal electronic device 900 to the wireless audio device 100*a*. The wireless audio device 100*b* may receive those commands, and take action based on them, in the same manner that it receives the audio transmissions meant for the wireless audio device 100*a*.

The technologies on which the links 115 and 915 are based dictate what is entailed in forming those links, and those links may be of any of a wide variety of types employing RF signals, infrared signals, or any of a variety of other forms of wireless transmission media. It is preferred for the sake of efficiency, though not necessary, that both of the links 115 and 915 be based on technologies that are at least similar enough to avoid having to incorporate two completely separate transceivers into either of the wireless audio devices 100*a* and 100*b*, since both must receive the same signal conveying audio from the personal electronic device 900. Where RF signals are employed, these links may at least partially conform to the Bluetooth specification, or to any of a variety of other specifications for wireless networking as would be appropriate in shortness of range and limited power consumption for portable devices that may be carried by a user on his or her person. As those familiar with such wireless specifications will readily recognize, such wireless communications are often accompanied with security mechanisms that include requiring two devices that are to be in such communication with each other to first undergo a link establishment procedure between them by which identification codes, security keys, etc., are exchanged between them. Depending on the technology on which each of the links 115 and 915 is based, one or both of the wireless audio devices 100*a* and 100*b* may engage in such link establishment procedures.

The link 115 may or may not require similar link establishment procedures to be formed. This may depend on the degree to which the wireless audio devices 100*a* and 100*b* may be received by a user as already configured to locate each other and interact with each other, and/or the degree to which each has been configured to employ a simplified link establishment procedure.

With the links 115 and 915 established and needed exchanges of information to enable required protocols already completed, the links 115 and 915 are able to be used in the transfer of audio from the personal electronic device 900 to both of the wireless audio devices 100*a* and 100*b*. As already discussed, the personal electronic device 900 transmits audio across the link 915 to the wireless audio device 100*a*, but the wireless audio device 100*b* also receives the same signal, and each of the wireless audio devices 100*a* and 100*b* extract the audio channels of use to each in audibly outputting audio to a user. The link 115 is used to coordinate various aspects of this activity between the wireless audio devices 100*a* and 100*b*, including and not limited to, synchronizing timing information, exchanging volume and various audio signal processing settings, and sharing data to implement noise cancellation functions. The link 115 may be employed for network management functions, most especially for the management of the link 915, including passing identity information to the wireless audio device 100*b* to enable the wireless audio device 100*b* to "listen in" on transmissions across the link 915, and passing decryption keys to the wireless audio device 100*b* to enable the wireless audio device 100*b* to decrypt audio and command transmitted across the link 915. By way of example, whichever one of the wireless audio devices 100*a* and 100*b* incorporates a manually-operable control (e.g., the control 122) that is employed as a volume control may transmit user volume settings to the other of these two devices.

Where the wireless audio device 100*a* incorporates the depicted control 122, and the control 122 is configured to send remote control commands to the personal electronic device 900 when manually operated, the link 915 is employed to convey those remote control commands from the wireless audio device 100*a* to the personal electronic device 900. Where the wireless audio device 100*b* incorporates a manually-operated control (not shown), and that control is configured to send remote control commands to the personal electronic device 900 when manually operated, the link 115 is employed to convey those remote control commands from the wireless audio device 100*b* to the wireless audio device 100*a*, which forwards those commands onward to the personal electronic device 900 via the link 915.

Figure 2:
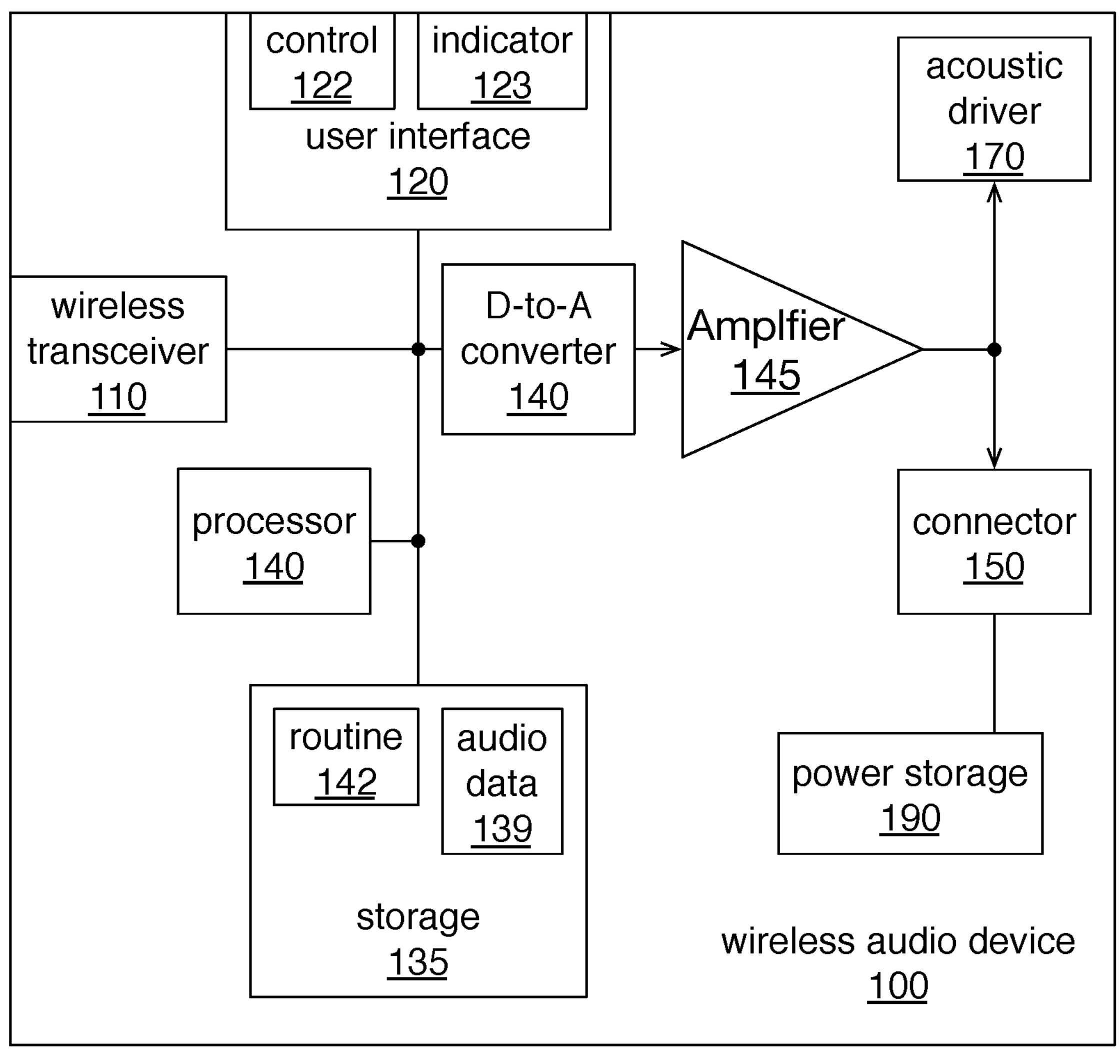
FIG. 2 is a block diagram of a wireless audio device of FIG. 1.

FIG. 2 is a block diagram of one possible internal architecture of either or both of the wireless audio devices 100*a* and 100*b* of FIG. 1. Although the wireless audio devices 100*a* and 100*b* may incorporate differing architectures, it is preferred that the wireless audio devices 100*a* and 100*b* of FIG. 1 be of the same architecture, such that their roles as described with regard to FIG. 1 could be reversed. This would be advantageous to achieve greater manufacturing efficiencies and to allow one replacement part to be required to resolve device failures, rather than two different parts, in the event that the two devices are paired earbuds.

The wireless audio device 100 incorporates a wireless transceiver 110, a user interface 120, a processor 130, a storage 135, a digital-to-analog (D-to-A) converter 140, an amplifier 145, a connector 150, an acoustic driver 170 and a power storage 190 storing and providing electrical power to the rest of these. As those skilled in the art of processor-based systems will readily recognize, a wide variety of bus architectures linking various ones of these may be employed, however, regardless of the exact architecture employed, the processor 130 is provided access to at least the wireless transceiver 110, the user interface 120, the storage 135 and the D-to-A converter 140. In some examples, one or more of the various components shown in FIG. 2 may be integrated into the processor IC. The processor 130 accesses the storage 135 to retrieve a sequence of instructions making up a routine 132, and in executing the routine 132, the processor 130 is caused to perform various functions during the operation of the wireless audio device 100.

The processor 130 may be any of a variety of types of processing device, including but not limited to, a general purpose processor, a digital signal processor or other more specialized processor having a limited instruction set optimized for a given range of functions, a microcontroller or combinational logic. The storage 135 may be based on any of a wide variety of information storage technologies, including but not limited to, static RAM, dynamic RAM, ROM of either erasable or non-erasable form, FLASH, magnetic memory, ferromagnetic disk storage, phase-change storage or magneto-optical storage. The storage 135 stores at least the routine 132, and depending on what audio processing and/or audio buffering functions are caused by the routine 132 to be performed by the processor 130, the storage 135 may also store an audio data 139.

The technology on which the wireless transceiver 110 is based depends on the technology of whatever wireless point-to-point links the wireless audio device 100 forms with other devices. At a minimum, execution of the routine 132 causes the processor 130 to operate the wireless transceiver 110 to receive audio from a personal electronic device, perhaps along with non-audio data. In various embodiments, and depending on the role occupied by a given one of the wireless audio device 100, the processor 130 may be further caused by the routine 132 to operate the wireless transceiver 110 to convey commands across a wireless point-to-point link, either to a personal electronic device or to another wireless audio device to be forwarded on to a personal electronic device. Where a wireless point-to-point link between the wireless audio device 100 and another device at least partly conforms to the Bluetooth specification or a similar specification for point-to-point wireless communication, the processor 130 may be caused by the routine 132 to operate the wireless transceiver 110 to carry out a link establishment procedure to establish that point-to-point link.

The user interface 120 incorporates one or both of the previously-discussed control 122 and indicator 123. The control 122 may be any type of manually-operable control, including but not limited to, a button, a lever switch, a rotatable knob, a touch-screen sensor, a pressure sensor, a proximity sensor or an orientation sensor. The indicator 123 may be any of a number of possible devices conveying information to a user of the wireless audio device 100, including but not limited to, a graphical display capable of depicting various symbols and/or language characters, one or more LEDs, a buzzer, or a vibration-generating device. Alternatively, information may be provided to a user of the wireless audio device 100 through the output of audio conveying that information which is mixed with the audio received by the wireless transceiver 110, with the mixed audio being output to the user. Where the control 122 is provided, the control 122 may be employed by a user of the wireless audio device 100 for one or more of initiating the performance of some form of link establishment procedure, controlling one or more aspects of the provision of audio to a user (e.g., the volume employed in outputting audio to the user), and remotely controlling another wireless device with which a point-to-point link is formed. Where the indicator 123 is provided, the indicator 123 may be employed to display information received by the wireless transceiver 110 from another wireless device and/or information generated by the wireless audio device 100, itself.

The D-to-A converter 140 and the amplifier 145 may each be of any of a wide variety of designs and forms. The D-to-A converter 140 may be accessible by the processor 130, not only to enable the processor 130 to supply the D-to-A converter 140 with audio data, but also to enable the processor 130 to operate the D-to-A converter to support differing timings, bit formats, etc., of the audio data received from another wireless device through the wireless transceiver 110. The amplifier 145 may be accessible by the processor 130 to enable the processor to control aspects of the amplification of the analog form of audio provided by the D-to-A converter 140, including the gain used in amplification, perhaps as a form of volume control. In some examples, the amplifier may directly receive digital signals, the digital-to-analog conversion being performed simultaneously with the generation of the amplified analog output signal.

The connector 150, at a minimum, enables an external power source to be connected to the wireless audio device 100, and may enable that external power source to recharge the power storage 190. In various embodiments, the connector 150 may also enable amplified audio from the audio amplifier 145 to be provided to an external acoustic driver, where either the wireless audio device 100 does not incorporate the acoustic driver 170, or a user desires to use an external acoustic driver in place of or in addition to the acoustic driver 170. Also, although a conventional implementation of the connector 150 may tend to incorporate multiple electrically-conductive contacts for conveying at least power and perhaps also commands and other data, those skilled in the art will readily recognize that the connector 150 may incorporate non-electrically-conductive approaches to conveying power, audio, commands and/or other data. By way of example, electromagnetic induction may be employed to convey power, where the connector 150 simply provides a physical guide by which an external power source is brought close enough to the connector 150 to put coils within close enough proximity to enable induction to occur. By way of another example, the connector 150 may incorporate one or more fiber optic components to enable audio, commands and/or other data to be conveyed using light, instead of electricity.

As previously discussed, depending on the nature of a point-to-point link between the wireless audio device 100 and another device, a link establishment procedure may be required to form the point-to-point link. In some embodiments, a user of both the wireless audio device 100 and another device (such as a personal electronic device or another wireless audio device) would operate both devices to initiate a link establishment procedure between them. For the wireless audio 100, this may entail the processor 130 being caused by the routine 132 to monitor the control 122 for an instance of the control 122 being operated by the user to initiate the link establishment procedure, and then operating the transceiver 110 to carry out the link establishment procedure.

With the point-to-point link established and initialized, the processor 130, in executing the routine 132, is caused by the routine 132 to operate the wireless transceiver 110 to receive audio and to separate the desired one or more audio channels from the audio. Depending on the number and configuration of audio channels in the received audio, and depending on the number and configuration of wireless audio devices receiving the transmissions of audio emanating from a given personal electronic device, the processor 130 may also be caused to perform some degree of signal processing to derive the audio to be audibly output by the wireless audio device 100. Then, the processor 130 is further caused to transfer audio to the D-to-A converter 140 where that audio is converted to analog form before being provided to the audio amplifier 145 to create amplified audio. Depending on whether or not the wireless audio device 100 incorporates the acoustic driver 170 and depending on whether or not the audio amplifier 145 is connected to the connector 150, the amplified audio output by the audio amplifier 145 is caused to be audibly output to a user by being presented to one or both of the acoustic driver 170 and the connector 150 to which an external acoustic driver may be connected.

Where a wireless device supports it, the establishment and initialization of a point-to-point link also enables the transfer of commands across that point-to-point link. Commands to remotely control the wireless audio device 100 may emanate from either a personal electronic device that also transmits audio or another wireless audio device. Similarly, commands emanating from the wireless audio device may control one or both of a personal electronic device and another wireless audio device. Other forms of data may similarly emanate from a personal electronic device and/or another wireless audio device. By way of example, where the wireless audio device 100 incorporates the control 122, the processor 130 may be caused by the routine 137 to monitor the control 122 for instances of a user operating the control 122 to remotely control an aspect of the operation of a personal electronic device, such as remote control commands to play, fast-forward or pause an audio recording that the wireless device is playing. In response to the user so operating the control 122, the processor 130 may be further caused to operate the wireless transceiver 110 to transmit a corresponding command to the wireless device.

As previously discussed, more than one wireless audio device must cooperate to receive and use multiple audio channels of audio that a personal audio device transmits to one of those wireless audio devices. As previously discussed, such coordination is enabled through the formation of additional wireless point-to-point links formed between the wireless audio devices (e.g., the link 115 between the wireless audio devices 100*a* and 100*b* in FIG. 1). Across that link, a wireless audio device having a link with a personal electronic device can transmit network management information such as authentication, identification and/or decryption information needed for other wireless audio devices to receive and use the transmissions of multi-channel audio (as well as other data) from the personal electronic device. Across that link, wireless devices are also able to synchronize audio timings so that different channels are audibly output by different wireless audio devices to a user in a manner that is synchronized. Across that link, remote control, indications of errors from packets of audio not received or received with corrupted audio data, and non-audio data may be exchanged between wireless audio devices and/or conveyed through a wireless audio device having a link with the personal electronic device.

Implementation Using BLE

Figure 3:
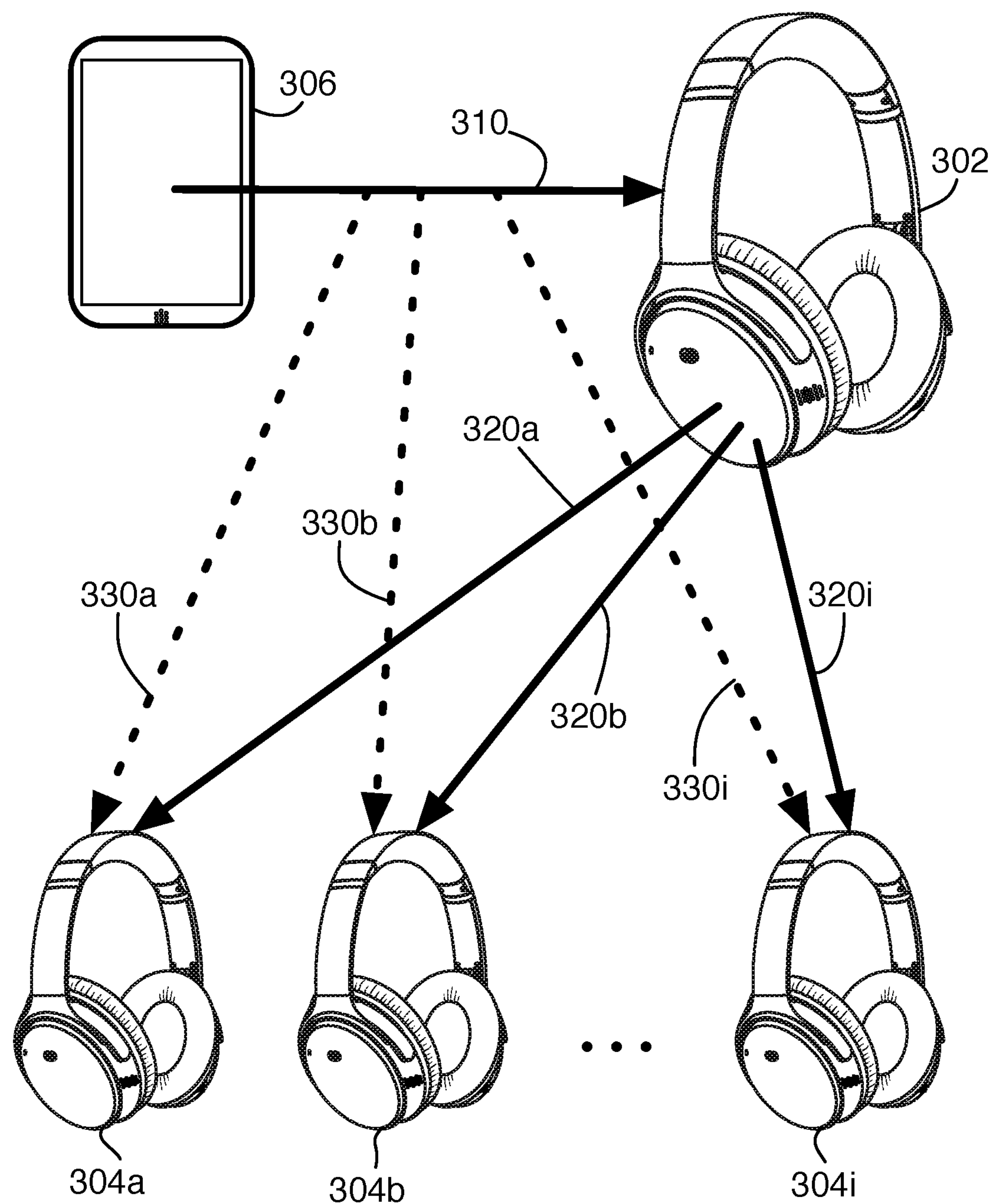
FIGS. 3 and 5 through 8 are block diagrams of wireless networks incorporating multiple wireless audio devices and a personal electronic device in different modes of operation.

One wireless technology that can be used for the link 115 between the wireless receiving devices is Bluetooth Low Energy (BLE), introduced with version 4.0 of the Bluetooth core specification. In particular, BLE allows the broadcasting of data without requiring a bi-directional link be established and secure point-to-multipoint connections. With this capability, as shown in FIG. 3, a first receiving device 302, which we refer to as the target, is able to share the data necessary for any number of additional receiving devices 304*a-i*, which we refer to as clones, to receive and decode audio and command data transmitted by the source device 306. In the example of FIG. 1, the first earpiece 100*a* may be the target device, and the other earpiece 100*b* is a single clone device. In other examples, as in FIG. 3, the target 302 and clones 304*a-i* are each stereo headphones, for use by multiple users to listen to the same audio transmitted from the source 306.

In the particular example of FIG. 3, link 310 between the source 306 and the target 302 is “classic” Bluetooth, i.e., Bluetooth BR/EDR, and it may also include a BLE component. Links 320*a-i* are BLE broadcasts or secure point-to-multipoint connections from the target to the clones, providing them with the source device’s Bluetooth device address (BDADDR), link key, and clock information. These pieces of data are used by the clones to decode the intercepted Bluetooth BR/EDR signal 310 sent from the source 306 to the target 302, shown as links 330*a-i*, and to synchronize the decoded audio. In some examples, the BLE links 320*a-i* are bi-directional, so that the clones can report status or other data back to the target 302. In addition to allowing the target to know which devices are listening in on the audio it is receiving from the source, the clones may report when they did not receive packets, or received corrupted packets, so that the target 302 can request a re-transmission from the source 306, as mentioned above.

Figure 4A:
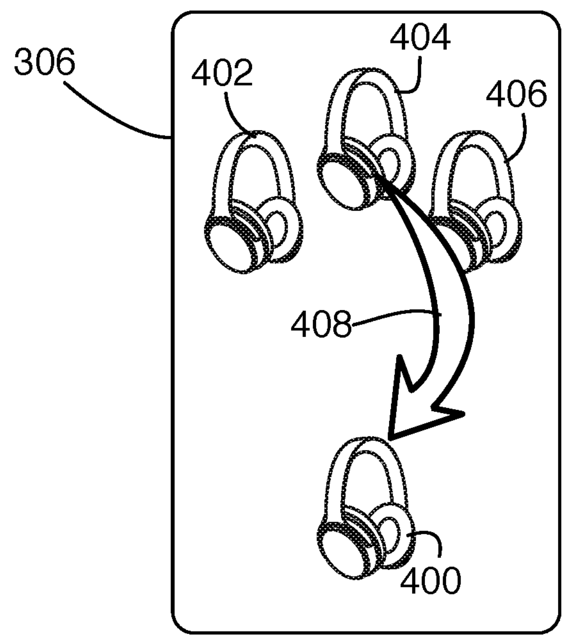
FIGS. 4*a* and 4*b* are example screens of a user interface.

In some examples, as shown in FIG. 4*a*, an application running on the source device 306, i.e., where the source device is a computer such as a smartphone, may be used for configuring both the target device and the clones, and the links between them. For example, a data channel in the BR/EDR link 310 (FIG. 3) may be used for communication between the application on the source 306 and the target device 302, in which the target device tells the application about the clones. This allows the application to display and control the clones even in cases where the smartphone’s own operating system, which controls the BR/EDR link, is unaware that the clones are listening in on its transmissions to the target. Such an application can then be used to initiate the cloning process, adding or removing clones, or sending additional control commands to the clones.

In the example interface of FIG. 4*a*, the application running on the source device 306 displays a representation 400 of the target device and representations 402, 404, 406 of the detected potential clones. These may be labelled with user names or other identifies provided by the potential clones (not shown). If the user selects one of the potential clones 404, for example by dragging it towards the target device 404 (arrow 408), the potential clone is configured to receive the audio signals intended for the target. Various interface conventions can be used for displaying the potential clones to the user. In one example, multiple icons are shown around the screens, with arbitrary positions or, for example, positions determined by their detected distance from the target device. In another example (not shown), the potential clones are displayed in a row, and the user can slide the row left or right to see more potential clones than fit on the screen. Note that the source device 306 is not itself aware of the clones, the app is merely displaying them based on information received form the target device, and configuring them via the target device. Thus, the operating system and other built-in functions of the source device do not need to be aware of or communicate with the clones in order for the user of the app and target device to control them.

Figure 4B:
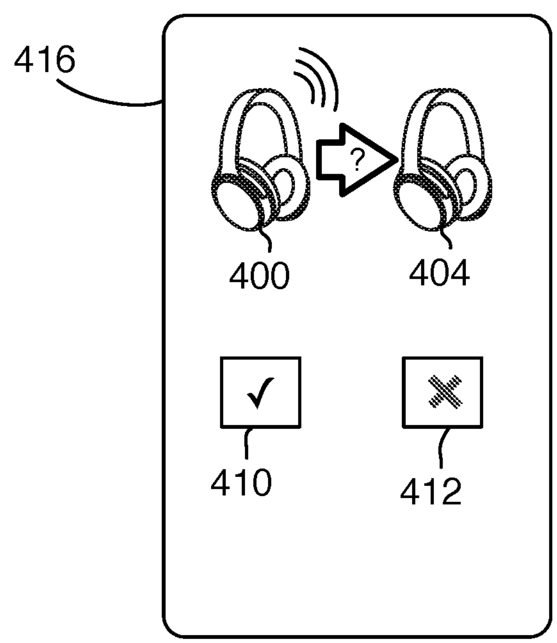

FIG. 4*b* shows an optional confirmation interface running on a second smart phone, such as the smartphone 416 associated with the owner of the headphone that the user in FIG. 4*a* selected for cloning. In this interface, the representation 400 of the target headphones is shown transmitting signals to the selected headphones 404. The user can approve (check box 410) or disapprove (412) allowing the cloning. In this example, transmissions are shown coming from the target headphones, for simplicity. In other examples, a representation of the source device 306 could also be shown, giving the user a more-accurate representation of what is happening.

Figure 5:
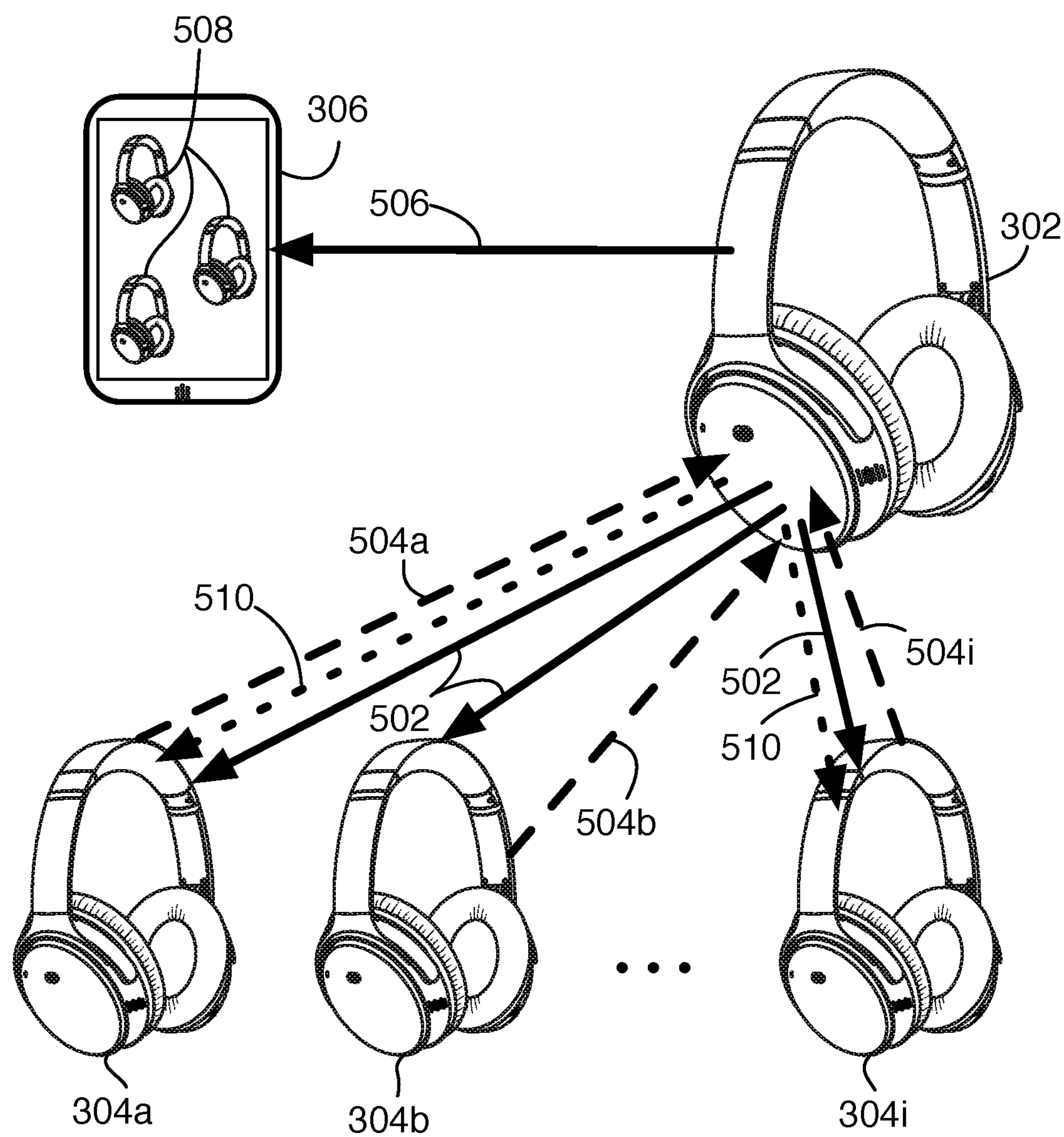

FIG. 5 shows the process by which the clones are created. It is assumed that the target device is already paired with the source device. An application running on a smartphone or other computer instructs the target to scan for potential clones. The target device scans using BLE to identify potential clones, broadcasting a query 502. Devices in range respond with messages 504*a-i*, each conveying a reserved universal unique identifier (UUID) that has been registered with the Bluetooth Special Interest Group (SIG). The target device's radio produces a received signal strength indicator (RSSI) for each received signal, and provides this data along with the UUIDs for each clone in a message 506 back to the application. The UUIDs and RSSIs may be used, if desired, to restrict the cloning to nearby devices. The UUIDs can also be used to restrict the cloning to devices of a given manufacturer, through whitelisting the matched clones' BLE device addresses at the target device 302. The application then displays the devices available to share audio with (508), and the user can specify which ones to use; the target then transmits the necessary information 510 to the selected devices. If the devices to be cloned are associated with other users, user interfaces on those devices or in the same or a similar application running on the other users' phones are used to approve the cloning process, at which time the cloned devices accept the transmitted data 510 and begin using it to intercept transmissions from the source (330*a-i*, FIG. 3). Alternatively, if the user of the target also owns or controls the clones, the same application used to initiate the cloning may be used to approve it for the clones (and this may be the same step as selecting the clones in the first place). In some examples, the bi-directional communication between target and clones is accomplished by role switching between BLE central and BLE peripheral roles to enable bi-directional communications within a broadcasting mode.

Figure 6:
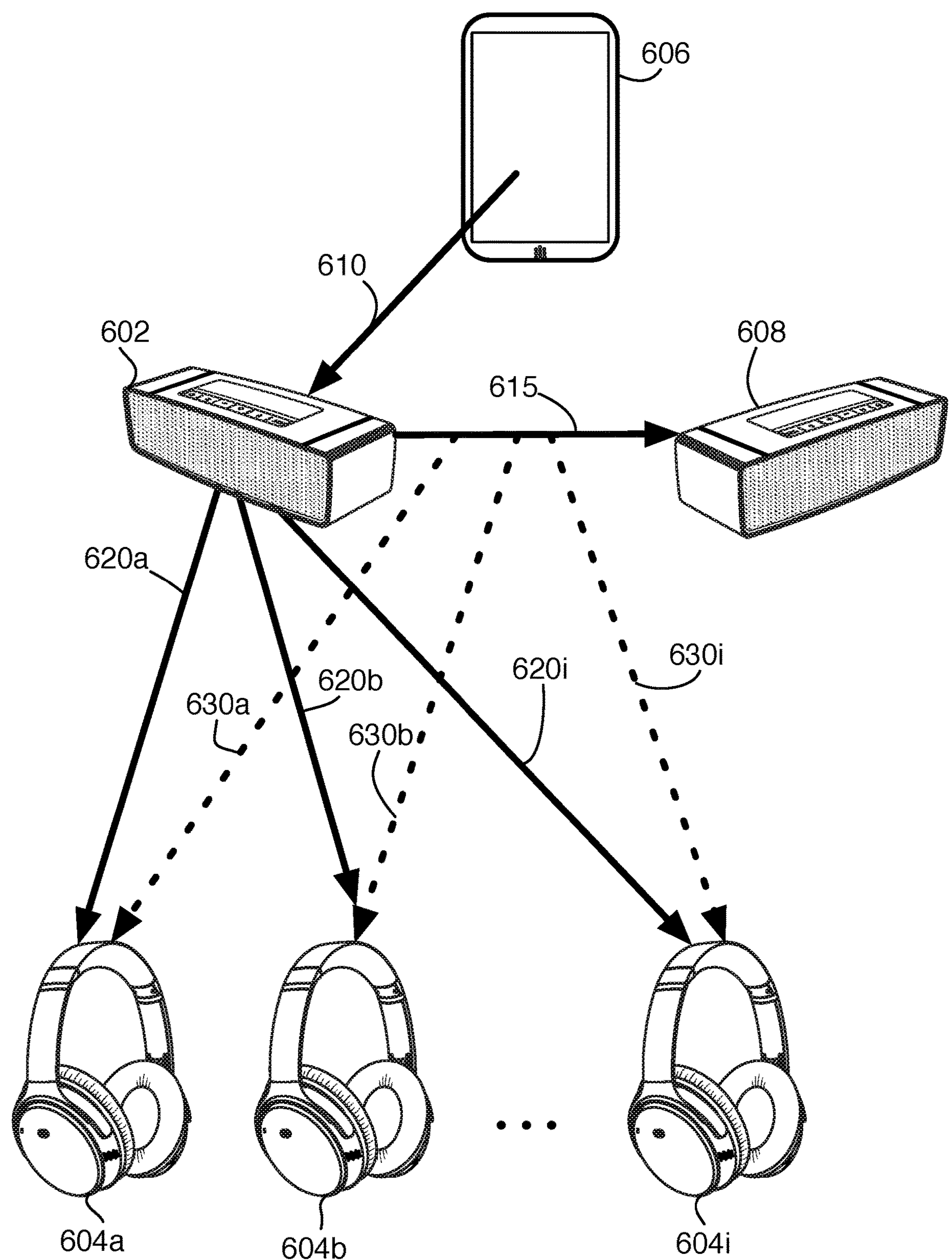

As shown in FIG. 6, another implementation combines the techniques described above with one of the alternative solutions developed for two-receiver implementations, which is sometimes called peer-to-peer or P2P mode. In P2P mode, the source 606 transmits audio 610 using classic Bluetooth to the primary target 602, and the target retransmits the audio 615 to a secondary target 608, such as the second half of a left/right pair of speakers, as shown, or a second earpiece in a fully-wireless headphone configuration. The P2P mode can also be used for audio sharing between two target devices that both playback stereo audio. The retransmission also uses classic Bluetooth, with the primary target 602 as the source, as far as the secondary target 608 is concerned. Clones 604*a-i* are created in the same manner as above, with BLE broadcast transmissions or secure point-to-multipoint connections 620*a-i*, but they intercept and decode the retransmission 615 from the primary target 602 to the secondary target 608 (shown as links 630*a-i*), rather than the transmission 610 from the original source. This has the advantage that the primary target 602, being the source of the retransmission 615 as well as controlling the cloning process, can modify the retransmission 615 to facilitate the interception by the clones.

Microphones

As mentioned above, FIG. 3 shows the target and clones as headphones. In addition to sharing content from the source, multiple headphones receiving the same audio signal can be useful for classroom settings and group tours, where the source is transmitting audio signals received from the teacher or tour guide's microphone. The target and clones may also be out-loud speakers, such as for playing sound throughout a larger room or in multiple rooms, or may be a combination of speakers and headphones for different users. Two examples of uses with multiple speakers around a room are surround systems and conferencing systems. In both the classroom/tour group and the conferencing system use case, an additional consideration is local audio inputs to the system, that is, from a microphone. If a microphone is connected to or integrated with the source device, it can be the source of the intercepted audio as in the above audio-sharing situations. However, it may be preferable to use microphones integrated into the target device, as these may have better voice pickup, or simply be more convenient to the user.

In the conventional arrangement, where a single Bluetooth headset or speakerphone device is used with a smartphone as the source, the target device uses the source device's BDADDR address, link key, and clock information to encrypt and address audio signals from the target device's microphone, and transmits the signal at a time slot designated by the source device. Other information that may be used includes hop sequence type, Bluetooth master clock, adaptive frequency hop (AFH) channel map, the BDADDR of the target device, the master clock offset of the target device, and the assigned LT ADDR (Logical Transport Address). When the clones are added to the system, two possibilities are presented.

Figure 7:
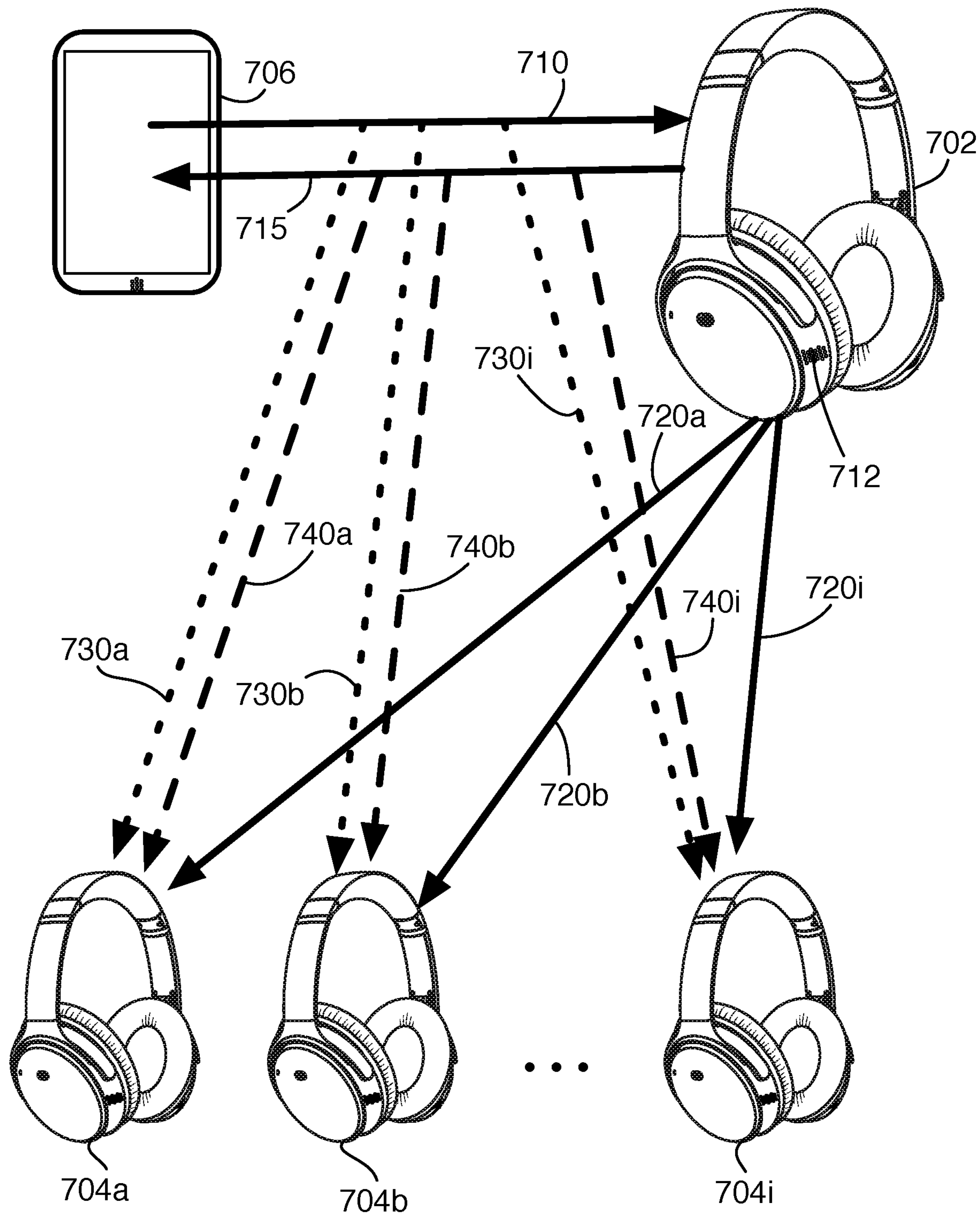

First, as shown in FIG. 7, the clones 704*a-i* may intercept the microphone transmissions from the target 702 back to the source 706. This may be particularly useful in a classroom or tour group context, where the leader uses the microphone 712 built into their headset (i.e., the target 702), rather than one attached to the source. The target 702 transmits the microphone audio to the source 706 (transmission 715), and all of the clones intercept it (740*a-i*), so that they can hear what the leader is saying. Intercepting the microphone transmissions uses the same information the clones already have for intercepting transmissions 710 from the source (730*a-i*), plus the timing information, which can be provided to the clones by the target in setup BLE broadcast transmissions or secure point-to-multipoint connections 720*a-i*. As shown in FIG. 7, the clones are intercepting the full-duplex communication between the target and source devices. In some examples, the clones only intercept the microphone transmissions 715, not the source-to-target audio transmission 710.

Figure 8:
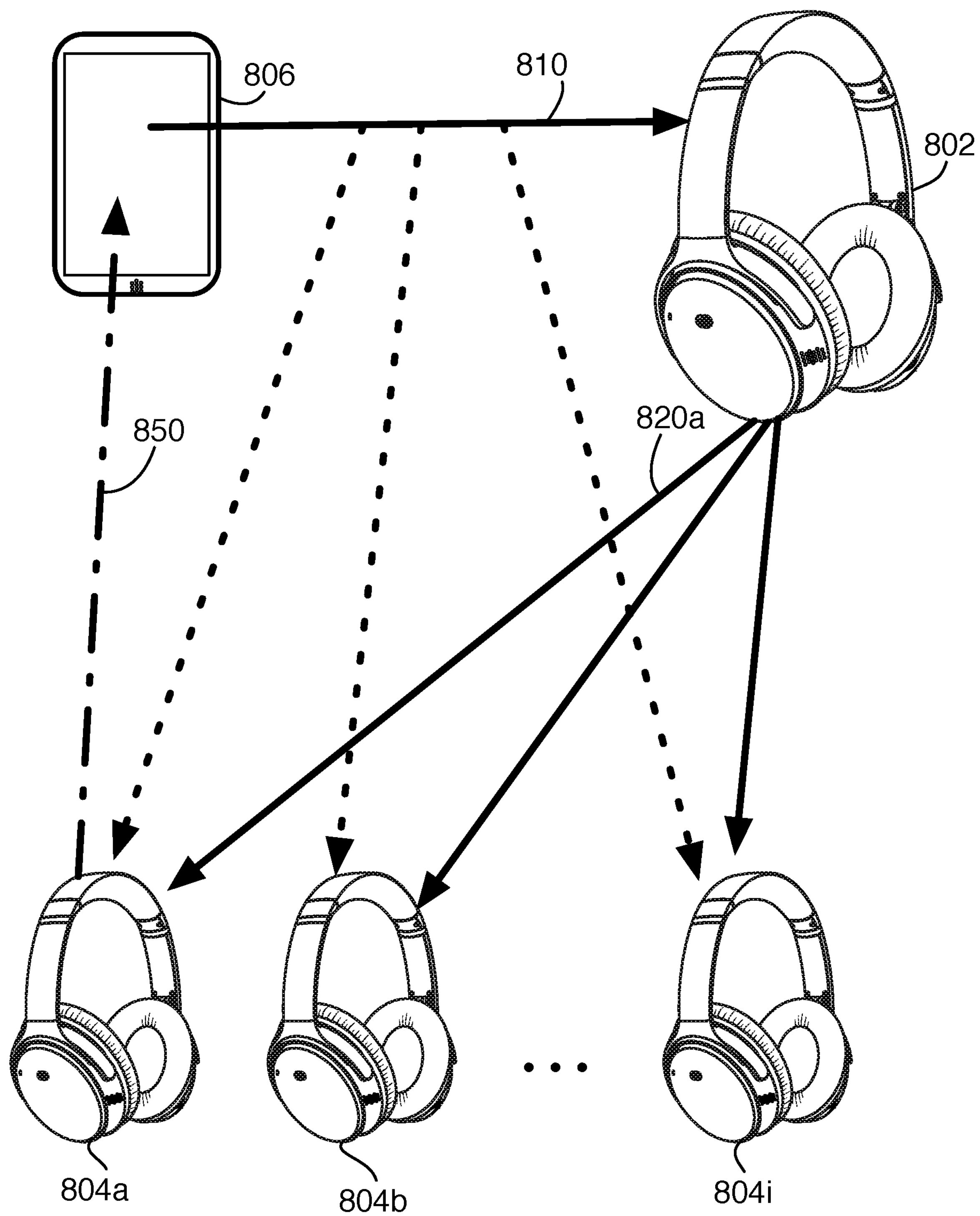

In another implementation, as shown in FIG. 8, some or all of the clones 804*a-i* have microphones 812*a-i*. When the user of a clone (804*a* for the example of FIG. 8) wishes to speak, they indicate this using a push-to-talk button or a voice activity detector (VAD), to name two examples. In response, the target 802 provides the necessary timing or other information to that clone (over link 820*a* in the example of FIG. 8), so that the clone 804*a* may transmit in the target's designated time slot, and the source 806 will receive the transmission 850, thinking that it came from the target 802. The real target refrains from transmitting itself while the clone is transmitting in its place. In other examples, the needed information is provided at the time the clones are created, and the push-to-talk or other signaling is used to coordinate transmissions among the target and the clones, to avoid collisions.

Other embodiments are within the scope of the following claims.

What is claimed is:

1. A system comprising:

a source device;

a first audio device; and a second audio device;

wherein processors in the first and second audio devices are configured to:

cause the first audio device to exchange first control signals with the source device and thereby to receive first audio signals from the source device, and cause the second audio device to exchange second control signals with the first audio device and thereby to receive the first audio signals from the source device;

wherein a processor in the source device is configured to execute a first application causing the source device to display a user interface allowing a user of the source device to control which second audio device the first audio device exchanges the second control signals with, the first control signals comprising communications using Bluetooth protocols and establishing a first Bluetooth link for audio streaming from the source device to the first audio device, and the second control signals comprising communications using Bluetooth Low Energy (BLE) protocols and transferring to the second audio device parameters of the first Bluetooth link, such that the second audio device can receive and decode an audio stream transmitted from the source device to the first audio device over the first Bluetooth link.

2. The system of claim 1, further comprising a third audio device, wherein the processor in the first audio device and a processor in the third audio device are configured to:

cause the third audio device to exchange third control signals comprising communications using Bluetooth Low Energy (BLE) protocols with the first audio device such that the third audio device can receive and decode the audio stream transmitted from the source device to the first audio device over the first Bluetooth link.

3. The system of claim 1, wherein:

the source device processor is further configured to execute a second application controlling the first control signals and the first Bluetooth link, and the second application is isolated from data relating to the second control signals.

4. The system of claim 1, wherein the processors in the first and second audio devices are further configured to:

cause the first audio device to transmit audio detected by a microphone in the first audio device to the source device using a return channel of the first Bluetooth link, and include in the second control signals parameters of the return channel, to enable the second audio device to receive and decode the first audio device's microphone audio from the return channel of the first Bluetooth link.

5. The system of claim 1, wherein the processors in the first and second audio devices are further configured to:

include in the second control signals parameters of a return channel of the first Bluetooth link, and cause the second audio device to transmit audio detected by a microphone in the second audio device to the source device using a return channel of the first Bluetooth link.

6. A system comprising:

a first audio device in communication with a second audio device; and a third audio device;

wherein processors in the first and third audio devices are configured to:

cause the first audio device to exchange first control signals with a source device and thereby to receive first audio signals from the source device, cause the first audio device to exchange second control signals with the second audio device and thereby cause the second audio device to receive second audio signals from the first audio device; and cause the third audio device to exchange third control signals with the first audio device and thereby to receive the second audio signals from the first audio device;

the first and second control signals comprising communications using Bluetooth protocols and establishing respective first and second Bluetooth links for audio streaming from the source device to the first audio device and from the first audio device to the second audio device, and the third control signals comprising communications using Bluetooth Low Energy (BLE) protocols and transferring to the third audio device parameters of the second Bluetooth link, such that the third audio device can receive and decode an audio stream transmitted from the first audio device to the second audio device over the second Bluetooth link.

7. The system of claim 6, wherein the first and second audio devices comprise a wirelessly-linked stereo pair of speakers, and the second audio signals include more than one channel of audio.

8. The system of claim 6, further comprising a fourth audio device, wherein the processor in the first audio device and a processor in the fourth audio device are configured to:

cause the fourth audio device to exchange fourth control signals comprising communications using Bluetooth Low Energy (BLE) protocols with the first audio device such that the fourth audio device can receive and decode the second audio signals transmitted from the first audio device to the second audio device.

9. A method of controlling audio devices, the method comprising:

communicating control signals with a first audio device, by a controller, over a wireless interface;

displaying, on a display associated with the controller, one of an image or identifying information representative of the first audio device;

receiving, by the controller over the wireless interface, from the first audio device, information about a second audio device;

displaying, on the display, one of an image or identifying information representative of the second audio device;

receiving, via an input device associated with the controller, a user selection of the second audio device, to be paired with the first audio device;

communicating with the first audio device, by the controller over the wireless interface, instructions to the first audio device to pair with the second audio device; and transmitting audio data to the first audio device, wherein the controller does not receive any communications from the second audio device.

10. The method of claim 9, further comprising:

communicating, by the second audio device to the first audio device, identifying information about the second audio device;

receiving, by the second audio device from the first audio device, control information necessary to receive the transmitted audio data;

receiving, by the second audio device, the transmitted audio data, using the control information; and rendering at least a portion of the transmitted audio data into an acoustic signal, by the second audio device.

11. The method of claim 10, further comprising:

receiving, by the second audio device, the transmitted audio data; and rendering at least a portion of the transmitted audio data into an acoustic signal, by the first audio device.

* * * * *